(12) United States Patent
Colmenero

(10) Patent No.: US 7,073,840 B1
(45) Date of Patent: Jul. 11, 2006

(54) PROTECTIVE COVERING DEVICE FOR PICK UP TRUCKS

(76) Inventor: Alex Colmenero, 8409 Golden Ave., Lemon Grove, CA (US) 91945

( * ) Notice: Subject to any disclaimer, the term of this patent is extended or adjusted under 35 U.S.C. 154(b) by 0 days.

(21) Appl. No.: 11/009,778

(22) Filed: Dec. 11, 2004

(51) Int. Cl.
*B60J 11/00* (2006.01)

(52) U.S. Cl. .............................. 296/136.1; 296/136.01; 296/136.07; 296/136.08; 150/166

(58) Field of Classification Search ............... 296/95.1, 296/98, 136.11–136.13, 136.01, 136.1, 136.07, 296/136.02, 136.08; 150/166; 160/370.21; 135/88.01, 88.05, 88.09; 280/770
See application file for complete search history.

(56) References Cited

U.S. PATENT DOCUMENTS

| 5,605,369 | A | 2/1997 | Ruiz ........................... 296/136 |
| 6,070,629 | A * | 6/2000 | Whiteside |
| D438,839 | S | 3/2001 | Wiedmann .................. D12/401 |
| 6,340,198 | B1 * | 1/2002 | Benites et al. ........... 296/136.1 |
| 6,371,547 | B1 * | 4/2002 | Halbrook ............... 296/136.07 |
| 6,431,944 | B1 | 8/2002 | Norman |

* cited by examiner

*Primary Examiner*—Stephen Gordon
(74) *Attorney, Agent, or Firm*—Goldstein Law Office PC

(57) ABSTRACT

A protective covering device for a pick up truck for easily securing to a front bumper and a cab of the pick up truck. The device has a plurality of sections integrally attached including a plurality of triangular sections, a rectangular section and an elongated section, having a lower end. A tie holds the triangular sections together for extending downwardly along a roof of the pick up truck. The rectangular section covers the hood and the elongated section stretches around the front bumper and cab. The lower end of the elongated section has an elastic fastener, rivets and clasps extending through the rivets for securing the device to the pick up truck.

7 Claims, 1 Drawing Sheet

PROTECTIVE COVERING DEVICE FOR PICK UP TRUCKS

BACKGROUND OF THE INVENTION

The invention relates to protective covering devices, and more particularly, to a protective covering device for a pick up truck for easily securing to a front bumper and rear cab of the pick up truck, thereby protecting the pick up truck from overexposure to the elements.

Millions of Americans own a pickup truck. Extremely useful vehicles, a pick up truck can be used for everything from moving furniture, to hauling fire wood, to even transporting groceries from the store to the home. Although originally driven mainly for utilitarian purposes, such as farming or construction, pick up trucks are now being driven for less practical reasons and men and women from all walks of life are purchasing pick ups solely due to their sleek design and driving comfort. High tech marvels, today's pick up trucks feature digital dashboards, electronic computer systems, CD players and cushiony, soft seating. With a wide variety of makes and models to choose from, there is a truck to meet the needs of just about any consumer.

Because a pick up truck is such a valuable and practical investment, most consumers regularly undergo simple steps to ensure the long life and smooth operation of their vehicles. Regularly changing the engine oil, checking the tire pressure and making sure that the brake and power steering fluid are at appropriate levels, are but a few key tasks involved in routine truck maintenance. Perhaps one of the most simple and surprisingly important steps one can take to care for their car is to park their vehicle in a garage or sheltered area between uses. Parking one's truck in a garage, carport, or similar covered shelter provides consumers a simple means of protecting their vehicle's delicate finish. Preventing the accumulation of harmful residue which results from excessive exposure to rain, mud, snow and sleet, parking a truck in a garage is especially important during rainy or snowy weather, as even the lightest rain or snow shower can leave behind a thin film of acid which can quickly eat away at the vehicle's paint and topcoat. In addition, parking a truck in a shaded area is important during the summer months, as high temperatures can transform the interior of a vehicle into a veritable sauna. Extreme temperatures, caused by the magnified glare of the sun through the front windshields, can melt cassette tapes, cosmetics and other personal goods stored within the vehicle, as well as damage the interior of the cab. Resulting in expensive repairs and replacement costs, the high interior temperature of a parked truck can cause ceiling fabric to droop, the padded dash to crack and even cause upholstery to fade.

Although there is little dispute that parking one's truck in a garage is a practical way in which to extend the life of the vehicle, this is not always possible. Specifically, for the millions of consumers who live in apartments, condominiums, mobile homes or houses which lack a covered garage or carport, parking a truck in the open air is simply a necessity. In addition, most long term parking lots, such as those found at airports and train depots are typically open, requiring travelers to leave their truck exposed to the elements for extended periods. Although most truck beds feature built in liners or protective coverings, the truck cab and hood nonetheless are left exposed to the elements when the vehicle is parked.

U.S. Pat. No. 5,605,369 to Ruiz discloses a protective cover for a vehicle comprised of sections for protecting the vehicle doors, windows, headlights and taillights. U.S. Pat. No. 6,431,944 to Norman discloses a figure or representative object that is attached to the top of a toy vehicle. U.S. Pat. No. D438,839 to Wiedmann discloses an ornamental design for a vehicle canopy device.

While these units may be suitable for the particular purpose employed, or for general use, they would not be as suitable for the purposes of the present invention as disclosed hereafter.

SUMMARY OF THE INVENTION

It is an object of the invention to produce a simple and efficient means for protectively covering a pick up truck from overexposure to the elements. Accordingly, the invention is a protective covering device having a plurality of integrally attached sections which easily secure to a front bumper and cab of the pick up truck, thereby simply and efficiently protecting the pick up truck from overexposure to the elements.

It is another object of the invention to provide a protective covering device capable of easily securing to the pick up truck. Accordingly, the protective covering device has an elongated section having an elastic fastener and a plurality of rivets for use with clamps or slips for easily and securely holding the protective covering device to the pick up truck.

This invention is a protective covering device for a pick up truck for easily securing to a front bumper and a cab of the pick up truck. The device has a plurality of sections integrally attached including a plurality of triangular sections, a rectangular section and an elongated section, having a lower end. A tie holds the triangular sections together for extending downwardly along a roof of the pick up truck. The rectangular section covers the hood and the elongated section stretches around the front bumper and cab. The lower end of the elongated section has an elastic fastener, rivets and clasps extending through the rivets for securing the device to the pick up truck.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
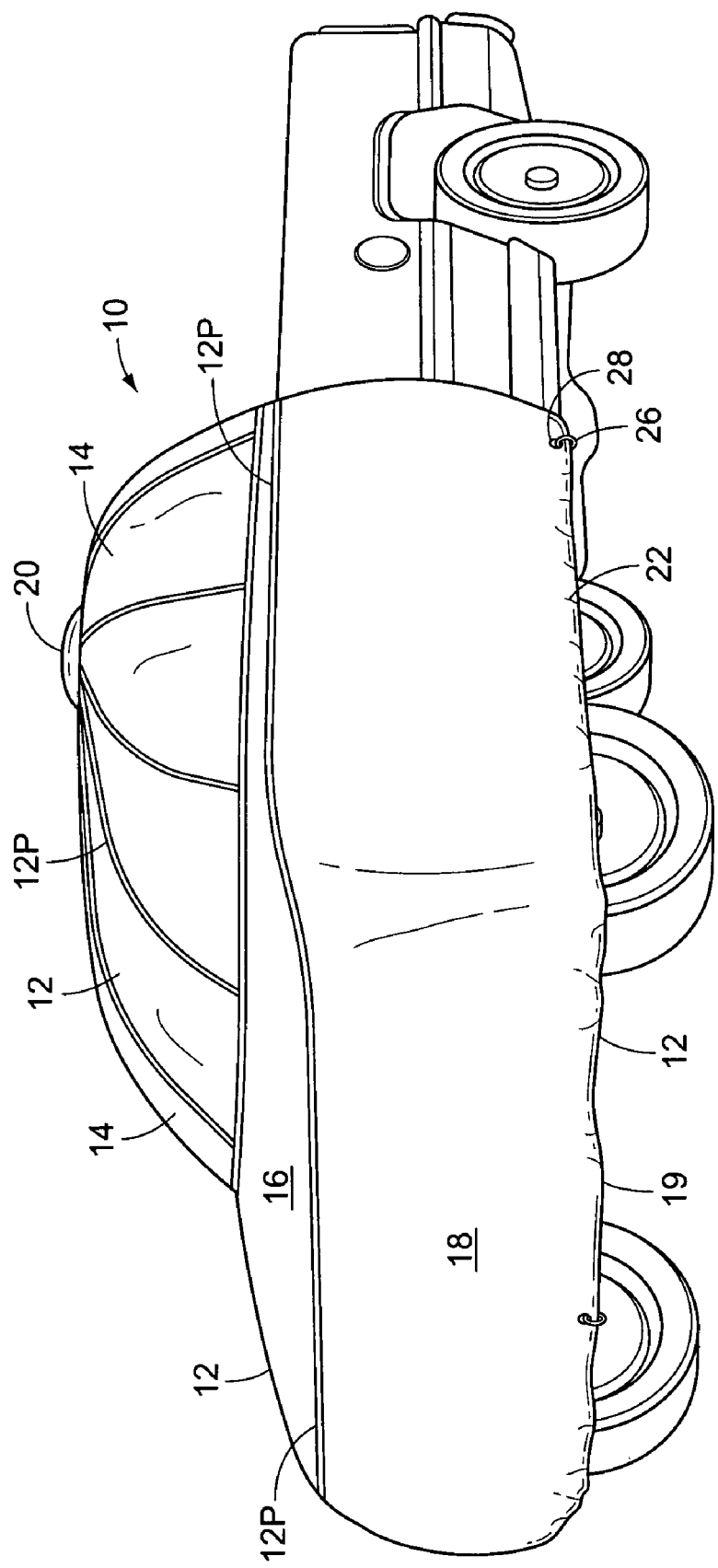
FIG. 1 is a diagrammatic perspective view of the protective covering device of the present invention for use on a pick up truck for easily securing to a front bumper and rear cab of the pick up truck, thereby protecting the pick up truck from overexposure to the elements.

FIG. 1 illustrates a protective covering device 10 for a pick up truck for easily securing to a front bumper and a cab of the pick up truck, thereby protecting the pick up truck from overexposure to the elements. The pick up truck also has a roof, hood and two/four doors, both the hood and doors having a bottom edge.

The protective covering device 10 includes a plurality of integrally attached sections 12, including a plurality of substantially triangular sections 14, a substantially rectangular section 16 and a substantially elongated section 18. The elongated section 18 includes a lower end 19. Each of the sections 12 includes a perimeter 12P which attaches the sections together in order to cover the pick up truck. A tie 20 holds the plurality of triangular sections 14 together. The triangular sections 14 extend downwardly from the tie 20 along the roof of the pick up truck. The triangular sections 14 are attached to portions of the rectangular section 16 along the perimeter 12P. The rectangular section 16 lies flat against the hood of the pick up truck. The elongated section 18 and the rectangular section 16 are also attached along portions of the perimeter 12P of each, and the elongated section covers the front bumper, cab, and side doors of the pick up truck.

A portion of the perimeter 12P of the elongated section 18, near the lower end 19, has an elastic fastener 22 extending therealong. The elastic fastener 22 is used to hold the sections 12 of the protective covering device 10 securely to the pick up truck. The elastic fastener 22 hugs the bottom edge of both the front bumper and doors.

A plurality of rivets 26 are spaced near the perimeter 12P of the elongated section 18 on the lower end 19. At least one rivet 26 is positioned near each door, and at least one rivet 26 is positioned along the front bumper. A clasp or clip closure 28 extends through the rivet 26 and securely holds the lower end 19 of the elongated section 18 securely to the pick up truck.

The sections 12 are preferably made of durable, weather resistant vinyl, canvas or similar material, in a variety of sizes for accommodating different sized pick up trucks. In addition, the sections 12 can be printed to mimic a two-tone baseball cap, having a bill, with the triangular sections 14 representing the cap and the rectangular section 16 representing the bill. In addition, the sections 12 can be made in a variety of colors.

In use, the protective covering device 10 provides users a simple and efficient means of protecting their parked pick up truck from overexposure to the elements. The protective covering device protects a finish of the pick-up truck from pounding rain, icy snow, hail and sleet, sun, bird droppings, falling leaves, and branches. The protective covering device eliminates repeated trips to car washes in order to maintain a clean appearance and ensures that the pick-up truck remains cleaner, longer.

In conclusion, herein is presented a protective covering device for a pick up truck for easily securing to a front bumper and rear cab of the pick up truck, thereby protecting the pick up truck from overexposure to the elements. The invention is illustrated by example in the drawing figures, and throughout the written description. It should be understood that numerous variations are possible, while adhering to the inventive concept. Such variations are contemplated as being a part of the present invention.

What is claimed is:

1. A protective covering device for a pick up truck for easily securing to a front bumper and a cab of the pick up truck, thereby protecting the pick up truck from overexposure to the elements, the pick up truck having a roof, hood and two or four doors, each door having a bottom edge, comprising:

a plurality of integrally attached sections including a plurality of substantially triangular sections, a substantially rectangular section and a substantially elongated section, the elongated section having a lower end, each section having a perimeter for connecting the sections together in order to cover the pick up truck, the triangular sections being attached to the rectangular section along their respective perimeters, the rectangular section being flat against the hood of the pick up truck, the elongated section and the rectangular section being attached along their respective perimeters, and the elongated section covering the front bumper, cab, and doors of the pick up truck;

a tie holding the plurality of triangular sections together and allowing the triangular sections to extend downwardly therefrom along the roof of the pick up truck;

an elastic fastener extending around a portion of the perimeter of the elongated section near the lower end for holding the sections of the protective covering device securely to the pick up truck and hugging a bottom edge of both the front bumper and doors;

a plurality of rivets spaced near the perimeter of the elongated section on the lower end; and a plurality of clasps extending through the rivets for securely holding the lower end of the elongated section securely to the pick up truck.

2. A protective covering device for a pick up truck for easily securing to a front bumper and a cab of the pick up truck, thereby protecting the pick up truck from overexposure to the elements, the pick up truck having a roof, hood and two or four, each door having a bottom edge, comprising:

a plurality of integrally attached sections including a plurality of substantially triangular sections, a substantially rectangular section and a substantially elongated section, the elongated section having a lower end, each section having a perimeter for connecting the sections together in order to cover the pick up truck; and an elastic fastener extending around a portion of the perimeter of the elongated section near the lower end for holding the sections of the protective covering device securely to the pick up truck and hugging a bottom edge of both the front bumper and doors.

3. The protective covering device of claim 2, wherein the triangular sections are attached to the rectangular section along their respective perimeters.

4. The protective covering device of claim 3, wherein the rectangular section is flat against the hood of the pick up truck.

5. The protective covering device of claim 4, wherein the elongated section and the rectangular section are attached along their respective perimeters and the elongated section covers the front bumper, cab, and doors of the pick up truck.

6. The protective covering device of claim 5, further comprising a tie for holding the plurality of triangular sections together and allowing the triangular sections to extend downwardly therefrom along the roof of the pick up truck.

7. The protective covering device of claim 6, further comprising a plurality of rivets spaced near the perimeter of the elongated section on the lower end.

* * * * *